Dec. 15, 1964 JITSUE IIDA 3,161,361

TAPE RECORDER

Filed Jan. 7, 1963

Jitsue Iida,

INVENTOR.

United States Patent Office 3,161,361

Patented Dec. 15, 1964

3,161,361

TAPE RECORDER

Jitsue Iida, 23 Nagasaki 4-chome, Toshima-ku, Tokyo, Japan, assignor of one-half to Eiraku Denki Kabushiki Kaisha, Tokyo, Japan Filed Jan. 7, 1963, Ser. No. 249,931
1 Claim. (Cl. 242—55.12)

In a conventional tape recorder, either in a capstan drive system or in a simple rim-type drive system, the axis of rotation of the reels on the winding side and the supplying side are fixed at certain places and the winding and supplying operations are carried out by rotating these reels.

In trying to design miniature portable tape recorders, it has been found to be impossible to eliminate the wasteful vacant space resulting from the limitations imposed by the use of reels. For example, when the whole length of a tape is taken upon one reel, the other reel is empty.

Accordingly, in order to further miniaturize tape recorders, special smaller reels have been used and, inevitably, the recording time is greatly shortened.

The present invention removes the aforementioned defects, and, though it employs a capstan drive system, its overall size is much smaller than for conventional tape recorders which handle the same amount of tape and its internal structure can be simplified.

Figure 1:
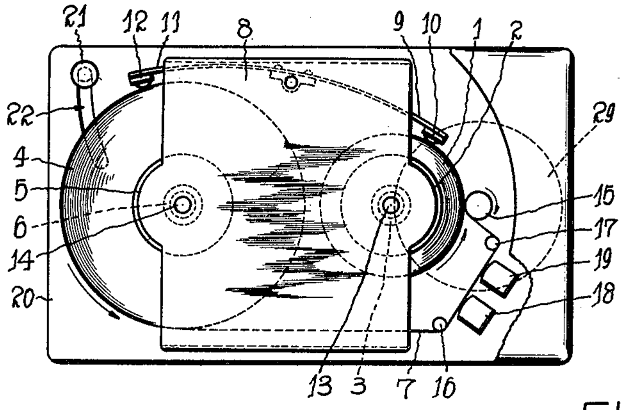
Figure 2:
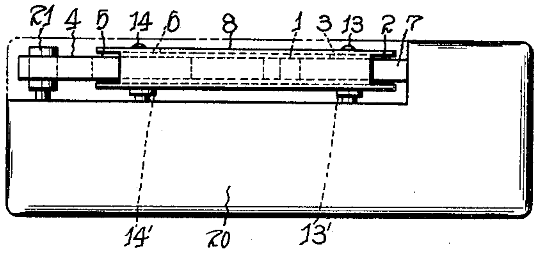
Figures 3, 4:
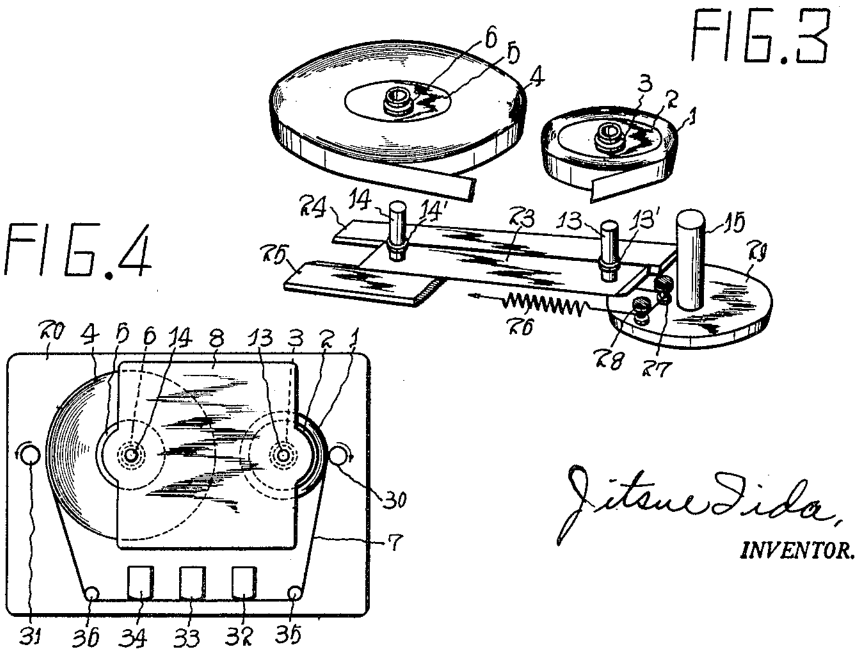

Now the construction of a tape recorder according to the present invention will be described in detail with reference to the illustrated embodiments in the accompanying drawings wherein:

FIG. 1 is a plan view of a tape recorder in accordance with the present invention, FIG. 2 is a side view of the same, FIG. 3 is a partially exploded perspective view of the essential portions showing the principle of the tape driving mechanism of the tape recorder shown in FIG. 1, and FIG. 4 is a plan view of another embodiment of a tape recorder in accordance with the invention.

The driving principle of a tape recorder of this invention will be explained hereunder in accordance with FIG. 1, FIG. 2 and FIG. 3.

In FIG. 1 and FIG. 2, 1 is a supply of tape on the winding side which is wound in a coil shape; 2 is a winding spool for a tape coil 1; 3 is the spool journal; 4 is a supply of tape on the supplying side which is wound in a coil shape in the same way as in tape coil 1; 5 is a winding spool; and 6 is the spool journal. 7 is a tape portion extending between tape coil 1 on the winding side and a tape coil 4 on the supplying side and on which portion is carried out the recording or reproduction. 8 is a tape winding frame made of plastic plates, or the like, and axles 3 and 6 are fixed in the neighborhood of the openings on both side of said winding frame. Spring 9 having on the end thereof a roller or pad 10 and spring 11 having a roller or pad 12 on the end thereof mounted on frame 8 extend symmetrically both right and left in FIG. 1 with the pads 10 and 12 against the tape in order to properly urge the tape against the tape coils to prevent it from becoming loose on the tape coils 1 and 4 when an operator is handling the tape. The ends of springs 9 and 11 which are connected to each other are freely rotatably mounted on tape winding frame 8 so as to make said springs 9 and 11 rotate as one coil decreases in size and the other increases. Therefore, tape winding frame 8 has the same shape on its upper and lower faces and no difficulty is caused in the driving of the tape even if the winding side and the supplying side are by mutually exchanging their positions, reversed. 13 and 14 are shafts which support journals 3 and 6 fixed to tape winding frame 8 and they do not revolve when a tape is driven. 15 is a driving capstan made of rubber, metal, etc. used for driving tape portion 7 at a fixed velocity in a fixed direction and it touches the circumferences of tape coil 1. 16 and 17 are tape guides; 18 is an erasing head; 19 is a head used for both recording and reproducing; 20 is a base stand; and 21 is a rewinding capstan made of rubber, metal, etc. used for rewinding of tape on winding spool 5 and it is mounted so as to be movable along groove 22 so that it will always touch the circumference portion of the rewound tape regardless of the diameter of the tape coil 4 and, when a recording or a reproducing run is taking place, it is spaced from tape coil 4 as shown in the drawings.

FIG. 3 is a drawing illustrating the principle of the lower mechanism with respect to tape coils 1 and 4, winding spools 2 and 5, journals 3 and 6 and shafts 13 and 14 of FIG. 1 and FIG. 2, and for these elements as shown in FIG. 1 and FIG. 2, identical numbers have been used.

Tape coil 1 is wound around winding spool 2 and it can rotate freely on shaft 14. The same is true with respect to tape coil 4, winding spool 5 and shaft 6.

Shaft 13 is inserted into journal 3 and journal 3 rests on and is supported on enlargement 13', and also, shaft 14 is inserted into journal 6 and journal 6 is supported on enlargement 14'. Incidentally, journals 3 and 6 can be provided with a collar for supporting and fixing them to tape winding frame 8. 23 is a slidable base on which shafts 13 and 14 are fixed and is slidably mounted on beveled edges of guide beds 24 and 25 which are fixed on the back side of base stand 20.

Incidentally, though it is not shown in the drawings, slidable base 23 is designed in order to decrease the friction caused when it slides so that only around both ends of the slide does it touch guide beds 24 and 25 and base stand 20, and no other portions touch them at all.

To one side of shaft 13 is located capstan 15 and slidable bed 23 is always being pulled towards the side capstan 15 by a tension spring 26. 27 and 28 are guide rollers for spring 26 and are fixed to base stand 20. 29 is a flywheel of capstan 15 and is connected to a driving electric motor to be provided separately. The tension of spring 26 holds the circumference of tape coil 1 supported by journal 3 against capstan 15 with a proper contacting pressure so that no slippage will be caused when it rotates.

If, in the above situation, as shown in FIG. 1, capstan 15 is rotated in the direction indicated by the arrow at a peripheral velocity identical with the necessary running velocity to be given tape portion 7, tape coil 1 rotates in the direction indicated by the arrow since it is rotatable freely on shaft 13. Tape coil 4, which is rotatable freely on shaft 14 also rotates in the direction indicated by the arrow unreeling tape portion 7; and, since the circumference of tape coil 4 is being pressed by a roller or pad 12 at the end of spring 11, a recording or a reproduction can be produced without causing any slack in tape portion 7.

During the rotation of capstan 15, the diameter of tape coil 1 increases gradually, and journals 3 and 6, and consequently, tape winding frame 8, shafts 13 and 14, and consequently, slidable base 23, move gradually towards the opposite direction away from capstan 15 along guide beds 24 and 25, being held against the side of capstan 15 by spring 26.

However, on the other hand, since the diameter of the coil 4 decreases gradually, the movement of the location of the circumference of tape coil 4 on the opposite side from tape coil 1 is small.

Accordingly, the space to the right and left necessary for accommodating tape coil 1 and tape coil 4 can be reduced to a great extent without causing any trouble as compared with tape recorders in the past when the length of a tape is fixed.

In the conventional mechanism, a tape driving rotation force was given to a reel axis, and there was provided a friction braking mechanism, and also the necessary tape driving rotation force changed to a great extent in proportion to the diameter of the tape coil. However, to the contrary, in the present invention, a tape driving force is given to the circumference portion of the tape coil 1 by capstan 15, and, since tape coils 1 and 4 are rotatable freely about their axes, the necessary tape driving force, and consequently the necessary rotating force for capstan 15 is nearly fixed and yet is very small during the operation of this apparatus, and it has no relationship to the diameters of the tape coils 1 and 4.

Accordingly, in case a small-sized electric motor and dry cells are used for driving, the consumption of electric power of the dry cell is small and its life can be lengthened.

Also by reversing tape winding frame 8 and by remounting journal 3 on shaft 14 and journal 6 on shaft 13, it is possible to perform easily a double track recording (or reproduction) on tape portion 7.

In this apparatus, a rewinding operation can be performed by moving rewinding capstan 21 along groove 22 to tape coil 4 and turning tape coil 4 in the opposite direction to the unwinding direction by driving said capstan manually or electrically.

In case a tape is taken up from another tape recorder on winding spool 5 of tape winding frame 8 or in case a tape is taken up on winding spool 2 by a normal driving, it is all right if an operation is carried out in accordance with the manner mentioned above by putting another tape recorder side by side on base stand 20, but in case a tape wound on conventional reels is taken up therefrom simply, it is all right if, in FIG. 1, a reel mounting stand is mounted so as to permit tape to be removed freely from the left side of the apparatus; said reel is fixed so as to rotate freely on said stand and the operation is carried out the same way as mentioned above. Also, in case tape coil 1 or 4 wound on tape winding frame 8 is taken up on the conventional reel, said reel is fixed on said reel mounting stand and the same is wound by rotating said reel properly. Needless to say that, in this instance, another tape recorder can be utilized.

FIG. 4 is another embodiment of a tape recorder in accordance with this invention, and in this case, a double track recording (or reproduction) is performed without refixing tape winding frame 8 as mentioned above.

In the apparatus as explained up to the present, the same numbers are used for the same items. However, springs 9 and 11 for urging tape coils 1 and 4 which should be fixed to tape winding frame 8 are omitted.

In FIG. 4, 30 and 31 are driving capstans which are driven at the same time by the same driving mechanism or are driven by a change-over. 32 is an erasing head to be used when tape portion 7 runs from right to left; 33 is a head used for both recording and reproduction which is used when tape portion 7 runs either left or right; and 34 is an erasing head which is used when tape portion 7 runs from left to right. Heads 32 and 34 bear on separate tracks, and head 33 contains two heads for each track. Each of them can be electrically combined and switched over. 35 and 36 are tape guides.

In case a recording or a reproduction is carried out by running tape portion 7 from left to right, in the same manner as in the apparatus of FIG. 1 and FIG. 3, tape coil 1 is pulled toward capstan 30 and said capstan 30 is rotated in the direction of the arrow. On the contrary, when a recording or a reproduction of another track is carried out by running tape portion 7 from the right to left, tape coil 4 is urged against capstan 31 by a change-over operation and capstan 31 is rotated in the direction of the arrow.

Thus, by the same operation as mentioned above, it is possible to carry out a double track recording (or a reproduction).

In FIG. 4, if the number of head elements contained in erasing heads 32 and 34 and recording and reproduction head 33 is increased and thus they are driven by combining or changing over them, it is possible to carry out a recording (or a reproduction) of a plurality of tracks without refixing tape winding frame 8.

As explained above, since, in a tap recorder in accordance with this invention, no conventional reel is used, and by employing a unique driving method, it is possible to prepare a very small-sized tape recorder, and also it is possible to make the consumption of electric power from the power source for an electric motor very small and its mechanism becomes simple.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

What is claimed is:

A tape recorder, comprising a sliding plate, two parallel shafts mounted on said sliding plate and spaced from each other, spools rotatably mounted on the shafts, said spools being adapted to have a tape wound thereon, one spool being a winding spool and the other being a supply spool, guide plates supporting said sliding plate for sliding in a direction transverse to the direction in which said parallel shafts extend and along a straight line extending through the two shafts, a capstan positioned adjacent the winding spool and adapted to press the tape being wound on the winding spool against the tape already wound on the winding spool for winding the tape on the spool, and a tension spring connected to said sliding plate biasing said sliding plate toward said capstan.

References Cited in the file of this patent

UNITED STATES PATENTS 2,804,508 Mastling ______________ Aug. 27, 1957